United States Patent [19]

Reed

[11] 4,232,231
[45] Nov. 4, 1980

[54] ROAD VEHICLE ELECTRICAL SYSTEMS

[75] Inventor: Kenneth R. B. Reed, Solihull, England

[73] Assignee: Lucas Industries Limited, Birmingham, England

[21] Appl. No.: 3,684

[22] Filed: Jan. 15, 1979

[51] Int. Cl.³ .......................... H04Q 3/00; H02J 1/00
[52] U.S. Cl. .............................. 307/10 R; 340/147 R
[58] Field of Search ............. 307/9, 10 R; 340/167 R, 340/168 R, 147 R, ; 364/200; 340/147 PC

[56] References Cited

U.S. PATENT DOCUMENTS

| 3,846,639 | 11/1974 | Veda et al. | 307/9 X |
| 4,085,403 | 4/1978 | Meier et al. | 307/10 R X |
| 4,156,151 | 5/1979 | Borroni | 307/10 R |
| 4,164,730 | 8/1979 | Weckenmann et al. | 307/10 R X |

Primary Examiner—L. T. Hix
Assistant Examiner—James L. Dwyer
Attorney, Agent, or Firm—Ladas & Parry

[57] ABSTRACT

A road vehicle electrical system includes a digitally controlled multiplex system whereby load devices distributed around the vehicle are controlled by signals from a transmitter connected to a plurality of receivers each controlling a group of load control devices. The transmitter produces a pulse train divided into digital words, each word including one set of bits identifying an address of a receiver and another set identifying an instruction code for the loads controlled by that receiver and determined by switches operable by the driver. Each receiver includes an address identification circuit and a storage device for the instruction code. A receiver acts on an instruction code only if the same instruction code is received in two successive cycles of the transmitter.

2 Claims, 5 Drawing Figures

ROAD VEHICLE ELECTRICAL SYSTEMS

This invention relates to an automotive vehicle electrical system of the digital multiplex type.

One known digital multiplex electrical system includes a transmitter to which a plurality of switches for controlling different functions of the vehicle electrical system. The transmitter produces on a data rail a cyclically repeated sequence of digital words generated in accordance with the state of the switches and each word is intended for a specific one of a number of receivers each of which is connected to a group of load control devices controlling individual electrical loads. Each digital word includes a group of bits defining an address code and a further group of bits defining a command code. The address code identifies the receiver for which the word is intended and the command code determines the desired state of the loads controlled by that receiver.

It is well known that the automotive environment is a very noisy one from the electrical point of view and any system utilizing digital word transmission and reception is likely to be subject to electrical noise interference. To prevent malfunction, therefore, it is desirable to verify that before any change in a command code is acted upon, the change is intended and not merely the result of noise.

In the prior art the noise problem is dealt with by clocking each complete command code into an input register of every one of the receivers. In the one receiver where the address code matches the address of that receiver the command code is stored and only when a given receiver has received the same command code in three successive cycles of operation is the command code acted upon.

This arrangement has several disadvantages. Firstly, a register with sufficient capacity to receive the whole digital word must be used and secondly there is a three cycle delay before any change of one of the switches can take effect.

I have discovered that a high level of security can be obtained with a shorter response time utilizing an input register large enough to receive just the address code and the command or utilization code alone.

In my improved system all the receiver input registers accept each address code but only that one receiver in which the address code is recognised continues to operate to accept the command code. The command code is accepted into the same input register in place of the address code. Since all the other receivers close down and do not accept the command code a high level of security is obtained.

In my improved system I also provide means to drive each load controlled by any receiver to a predetermined "safe" condition in the event that a command code verification system associated with the receiver fails to produce within a predetermined period of time a signal indicated the command code verification has taken place. Thus, for example, where verification requires two successive command codes for a specific receiver to be the same, the command code verification circuit produces an output every time the command code accepted by the receiver is the same as that accepted in the preceding cycle. This output resets a timer having a time duration substantially longer that two cycles, the timer acting to activate the failsafe circuit if its time duration expires without it having been reset.

The accompanying drawings show one example of a road vehicle electrical system in accordance with the invention, and in the drawings.

Figure 1:
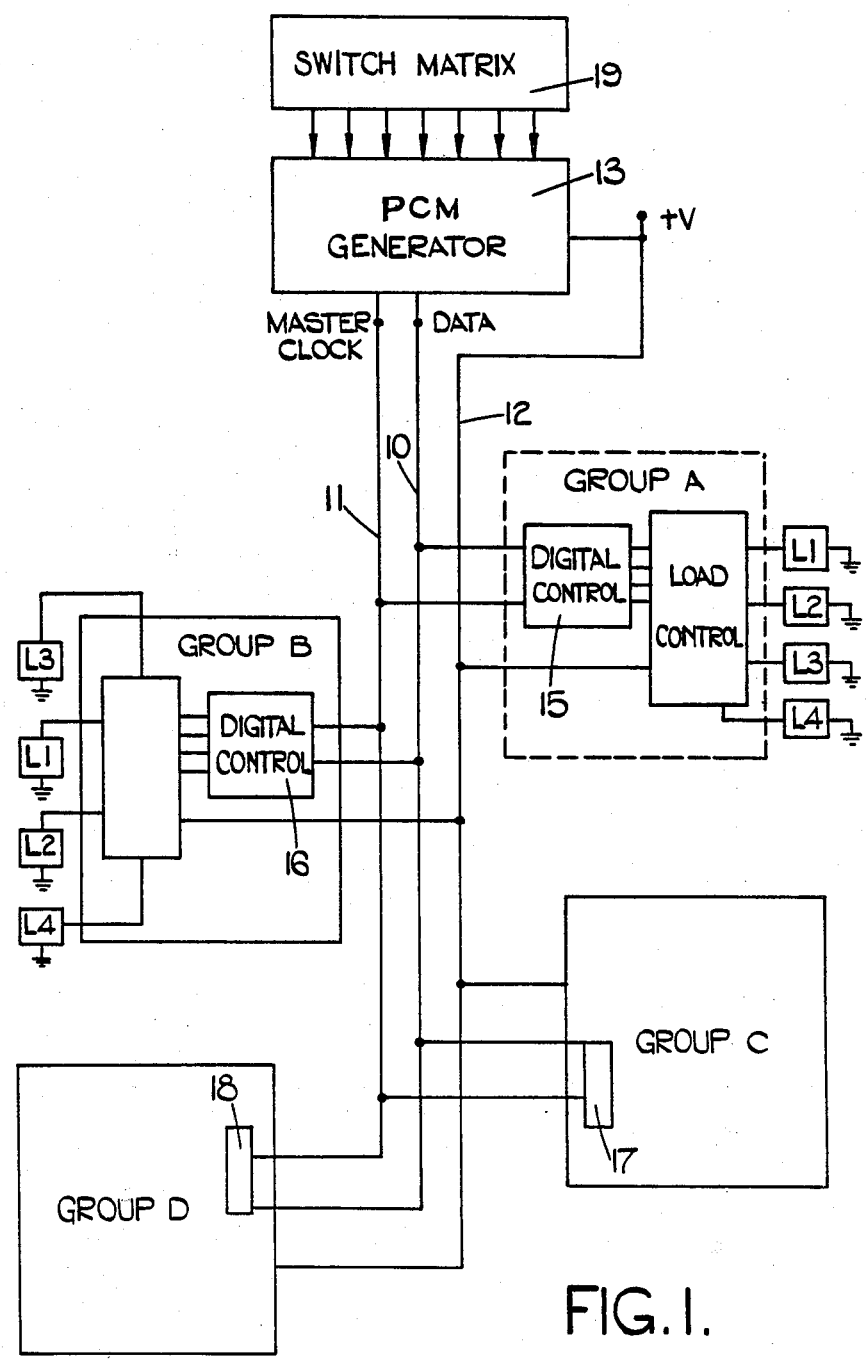
FIG. 1 is a diagrammatic representation of the whole system.

Referring firstly to FIG. 1, the system includes a data rail 10, a master clock rail 11 and a supply rail 12 which extend from a pulse code modulated signal generator 13 to a plurality of digital control circuits 15, 16, 17 18 etc., Each digital control circuit controls four different loads in the vehicle system in accordance with signals it receives from the generator 13 which are in turn determined by the settings of switches in a switch matrix 19.

Figure 2:
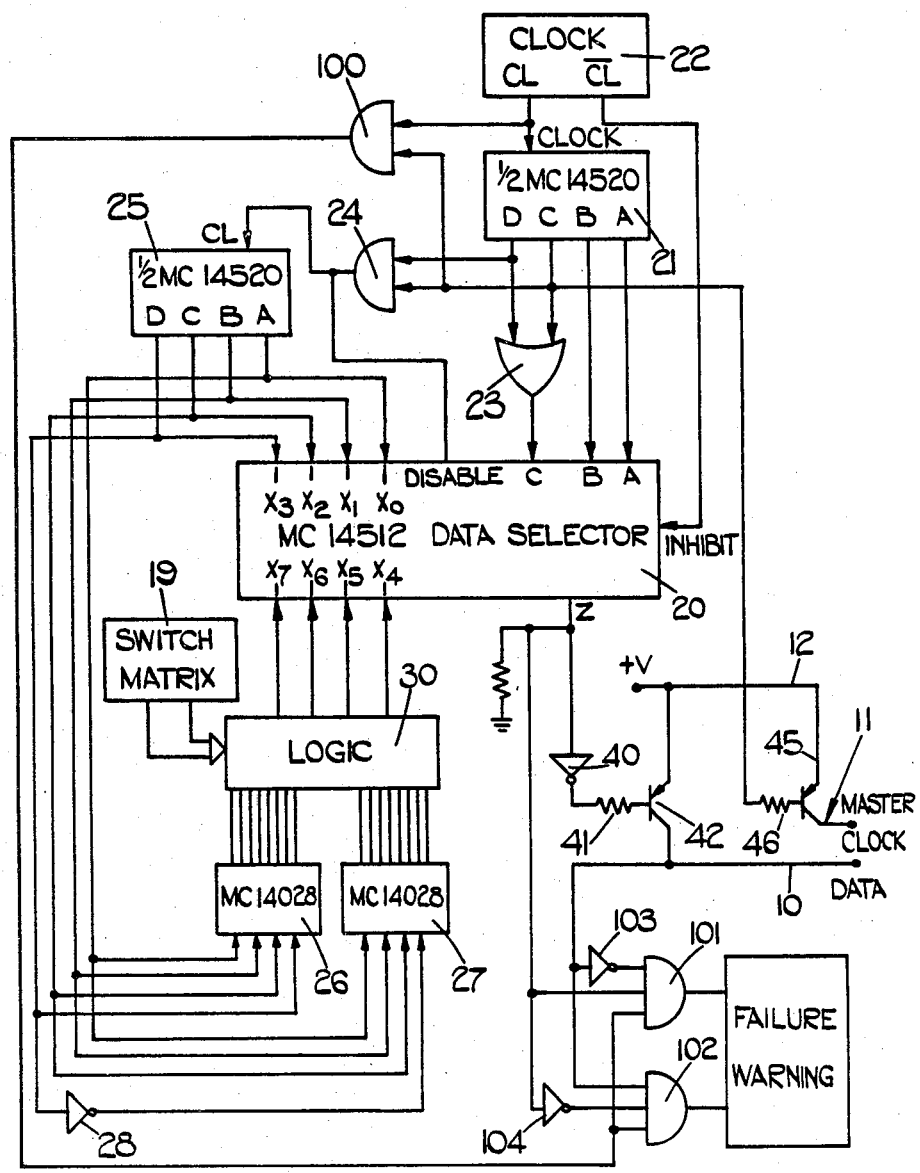
FIG. 2 is a diagrammatic representation of a pulse code modulation signal generator forming part of the system.

Turning now to FIG. 2 it will be seen that the generator makes use of an 8-channel data selector 20 (Motorola CMOS integrated circuit type MC 14512) to generate signals at its Z data output terminal according to the binary code applied to its A, B and C input terminals and the corresponding inputs at its $X_0 \ldots X_7$ data input terminals. A four bit binary counter 21 is driven by a clock 22 so that the signals at its A, B, C and D output terminals progress through the usual binary counting sequence 0000,0001 0010 ... etc. The A and B output terminals of the counter 21 are connected to the A and B input terminals of the selector 20, but the C and D output terminals of the counter 21 are connected to two input terminals of an OR gate 23, the output terminal of which is connected to the C input terminal of the selector 21. The INHIBIT input terminal of the selector 20 is connected to a $\overline{\text{CLOCK}}$ terminal of the clock 22, so that spurious signals occurring during changes in the counter state are not transmitted.

The C and D output terminals of the counter 21 are also connected to two input terminals of an AND gate 24, the output terminal of which is connected to the CLOCK terminal of another 4-bit binary counter 25 and also to the DISABLE terminal of the selector 20. The A, B, C, and D output terminals of the counter 25 are connected to the $X_0$, $X_1$, $X_2$ and $X_3$ data input terminals of the selector 20. There are also provided two binary to octal decoders 26, 27 (Motorola MC 14028 CMOS integrated circuits) connected with an inverter 28 in known manner to provide 1 of 16 decoding and the sixteen outputs of those decoders 26, 27 are applied to a logic circuit 30 (see FIG. 3) the four outputs of which are applied to the $X_4$, $X_5$, $X_6$ and $X_7$ data input terminals of the selector 20.

Figure 3:
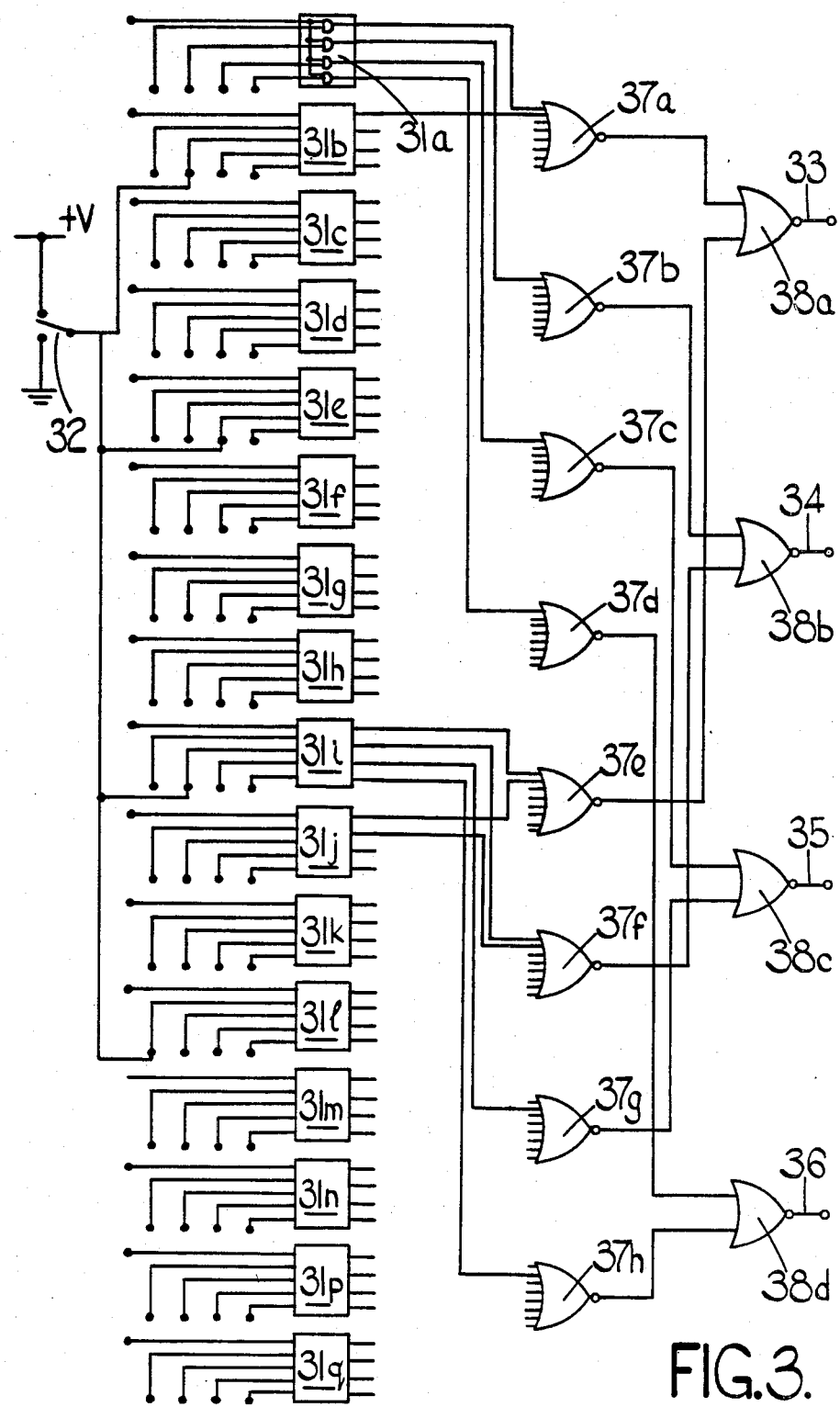
FIG. 3 is a diagram of a logic circuit forming part of the generator of FIG. 2.

Turning briefly to FIG. 3 the logic circuit 30 is seen to comprise sixteen quadruple two input AND gates $31^a \ldots 31^q$.

Each group of AND gates has an input from an associated one of the outputs of the decoders 26, 27 and also has four inputs from the switch matrix 19. One example of a connection to the switch matrix is shown. A switch 32 is connected to four different AND gate input terminals. This switch 32, may for example, be a switch intended to control the vehicle parking lamps. Further explanation will be given hereinafter in the discussion of the operation of the system.

Since the decoders 26, 27 operate as a 1 of 16 decoder only one of the groups of AND gate $31^a$ to $31^q$ is enabled at any given time. The remainder of the circuit shown in FIG. 3 is intended to ensure that the outputs from the enabled AND gate are communicated to the output terminals 33, 34, 35 and 36. If sixteen input OR gates were readily available the circuit would simply consist of four such gates. However, since such gates are not readily available the same logical function is achieved using eight input NOR gates $37^a$, to $37^h$ and four two input NOR gates $38^a$ to $38^d$. Most of the connections between the AND gates 31 and the NOR gates 37 are omitted for simplicity but these connections will be readily understood by one skilled in the art.

Returning now to FIG. 1 it will be appreciated that each four bit binary output of the counter 25 represents the address code of one of the digital control circuits 15, 16, 17, 18 etc of FIG. 1 and output of the logic circuit 30 represents the utilization code of that group. Commencing at an instant when the output of the counter 21 becomes 0000, therefore, the C input of selector 20 is 0 so that the data at $X_0$ (i.e., the least significant bit of the address code) appears at the Z data output terminal. When the counter 21 output changes to 0001, the $X_1$ data appears at Z, at 0010 the $X_2$ data appears at Z, and at 0011 the $X_3$ data appears at Z. Thus during these first four counts the address code appears in pcm form at the Z output. At a count of 0100 the $X_4$ data appears at Z and so on, so that during these next four counts the utilization code appears at Z in pcm form. At a count of 1000 the $X_4$ data appears again at Z so that the utilization code is transmitted again. During the final four counts of the 16 count cycle the output of gate 24 goes high to disable the selector 20 and to cause clocking of the counter 25.

The Z data output terminal of the selector 20 is connected by two logical inverters 40, and a resistor 41 to the base of a pnp transistor 42 the emitter of which is connected to the supply rail 12 and the collector of which is connected to the data rail 10.

The master clock rail 11 is controlled by another transistor 45 with its base connected via a resistor 46 to the C output terminal of the counter 21, its emitter connected to the supply rail 12 and its collector connected to the rail 11. Thus the signal on the master clock rail 11 is high during transmission of the address code and during the second transmission of the utilization code, but low during the other two quarters of the cycle of counter 21.

FIG. 2 also shows some components of a failure warning system which will be described hereinafter.

Figure 4:
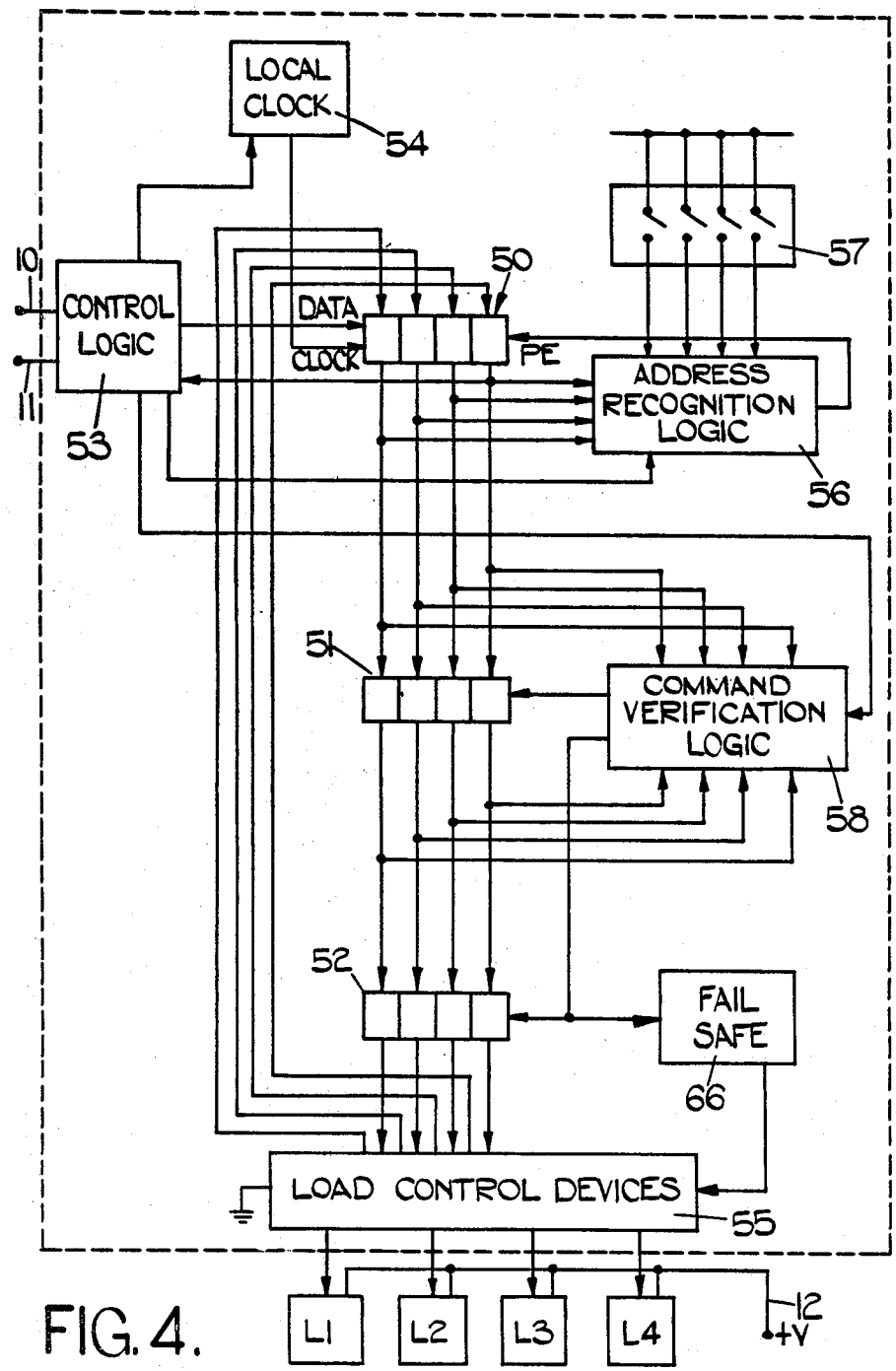
FIG. 4 is a diagram of one group digital control circuit of the system.

Turning now to FIG. 4 the digital control circuit includes a shift register 50 and two 4 bit latches 51 and 52. The shift register 50 may be regarded as an input register since it receives data from the data rail 10 under the control of a control logic circuit 53 and a local clock 55. The logic circuit 53 acts to admit data pulses from the data rail 10 to the register 50 whilst the signal on the master clock rail 11 is high.

The latches 51 act as a buffer register which receives data from the register 50 at certain instants as will be explained hereinafter. The latches 52 act as an output register which receives data from the latches 51 and provides output signals actually controlling the load control devices 55.

The register 50 also receives data at one stage in the cycle from data outputs associated with the load control devices (see FIG. 5) and this data is subsequently clocked out on to the data rail 10 under the control of the logic 53. The "parallel enable" terminal of the register 50 is controlled by address recognition circuit 56 which produces an output whenever the address code in the register 50 is the same as the code set up on four switches 57 (or conductive links) of the control circuit.

For controlling loading the latches 51 and 52 there is a command verification logic circuit 58 the output of which goes high at an appropriate instant in the cycle if the codes stored at that instant in the register 50, and the latches 51 are identical. One output terminal of circuit 58 is connected directly to the LOAD terminal of the latches 52 and another to the LOAD terminal of the latches 51.

At the beginning of a pulse train of the pulse code modulated signal generator, the master clock rail 11 signal goes high thereby resetting the local clock. The local clock 54 is approximately synchronised with the clock 22 to a degree of accuracy sufficient to ensure that during the first twelve counts of the local clock 22, the local clock signal goes high whilst the signal from clock 22 is high. Greater accuracy of synchronisation is unnecessary. Each local clock signal causes the data present on the data line to be clocked into the register 50. Thus, after four clock pulses the register 50 contains the address code. At this stage the address recognition logic circuit 56 provides a pulse to the "parallel enable" terminal of the register 50, if (and only if) the address code in the register 50 matches the address of that group as set up on the switches 57.

The data from the load control devices 55 is thus loaded into the register 50 so that the next four pulses of the clock cause this data to be fed serially from the last stage of the register to the data rail 10 via the logic circuit 53 (the master clock rail 11 signal being low at this stage).

The next four clock pulses cause the utilization code to be fed serially into the register 50 and circuit 58 causes the latches 52 to receive data from the latches 51 if the contents of register 50 and the latches 51 are the same or the latches 51 to receive data from the register 50 if not.

During the next four clock pulses the system is quiescent to allow the load control devices 55 time to operate.

It will be appreciated that the existing commands to the load control devices 55 are not changed as soon as the utilization code is changed as a result of one of the switches in the switch matrix having been operated. Instead no action is taken until the new utilization code has been received in two successive cycles. As a result any noise pulses entering the system will not have any effect on the load control devices. Should a noise pulse occur during the address code transmission stage (so that the utilization code is received by the wrong group) or during the utilization code transmission stage, the in-correct utilization code will be entered into the register 51, but since it is very unlikely that the same fault will occur, at precisely the same instant in the next following cycle, the utilization code will be corrected in the next following cycle and there will be no effect on the load control devices.

Figure 5:
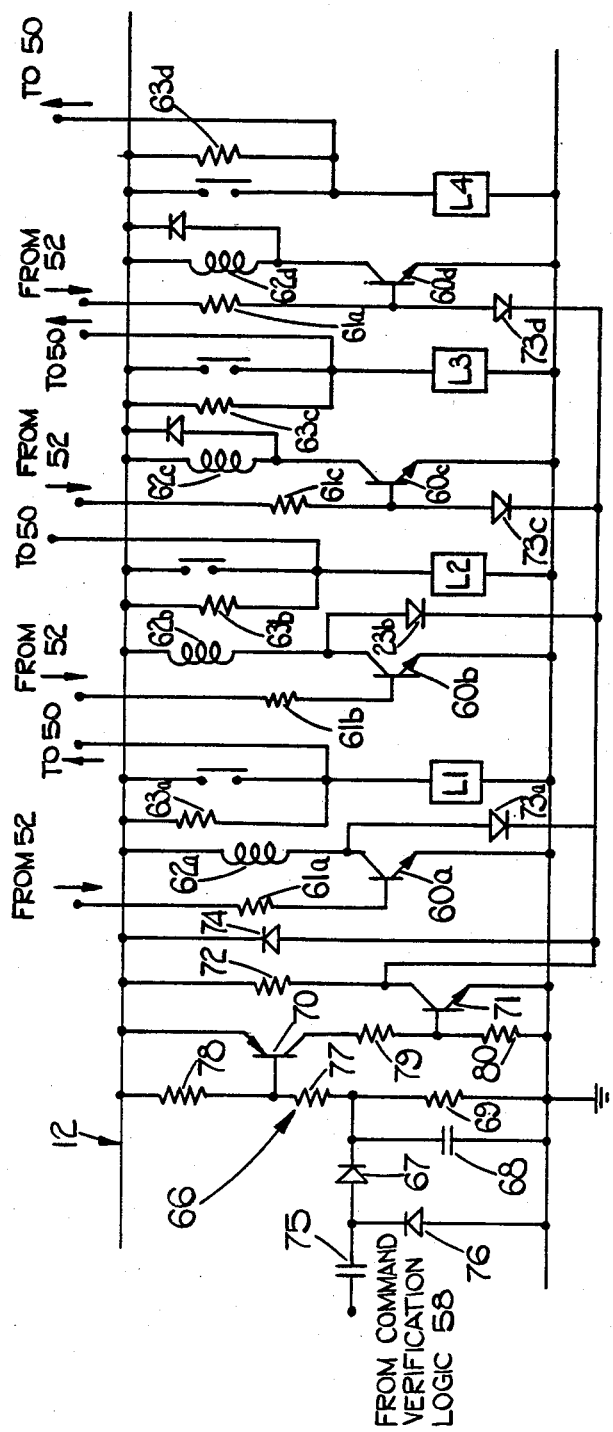
FIG. 5 is a detailed diagram of a group of load control devices controlled by the circuit of FIG. 4.

Turning now to FIG. 5, each of the load control devices includes an npn Darlington transistor $60^a$ $60^b$ $60^c$ $60^d$ with its emitter earthed and its base connected by a resistor $61^a$, $61^b$, $61^c$, $61^d$, to the appropriate output terminal of the register 52. The collector of each such transistor is connected by a relay winding $62^a$, $62^b$, $62^c$, or 62$^d$, to the supply rail 12. The load devices L$_1$, L$_2$, L$_3$ and L$_4$ are connected in series with normally open contacts of respective ones of the relays between the supply rail 12 and earth.

The load condition data signals are derived from connections to the junctions of the loads with their respective control contacts, such contacts being bridged by resistors 63$^a$, 63$^b$, 63$^c$, and 63$^d$ so that these signals are high when the contacts are closed, but low when the contacts are open.

For enabling the loads to be selectively energised in the event of a failure of the electronics there is provided a "failsafe" circuit 66 which is normally held inactive by pulses from the command verification logic circuit 58. The "failsafe" circuit includes an input capacitor 75 connecting the output terminal of the circuit 58 to the anode of a diode 67, with its cathode connected to one side of the capacitor 68 the other side of which is grounded, a resistor 69 being connected across this capacitor. A further diode 76 has its cathode connected to the anode of diode 67 and its anode grounded. The cathode of the diode 67 is also connected to the base of a pnp transistor 70 via a resistive potential divider 77, 78 the emitter of which is connected to the supply rail 12 and the collector of which is connected via resistive potential divider 79, 80 to the base of an npn transistor 71. The emitter of the transistor 71 is connected to the earth rail and its collector is connected by a load resistor 72. The collector of the transistor 71 is also connected to the cathodes of three diodes 73$a$, 73$b$, 73$c$ and 73$d$ associated with the load control devices of the loads L$_1$, L$_2$, L$_3$ and L$_4$ respectively. In the case of loads L$_1$, and L$_2$ it is required for these to remain energised in failsafe condition, whilst loads L$_3$ and L$_4$ are required to be de-energised. Diodes 73$a$ and 73$b$ therefore have their anodes connected to the collectors of the transistors 60$a$ and 60$b$ whilst diodes 73$c$ and 73$d$ have their anodes connected to the bases of the transistors 60$c$ and 60$d$.

Whilst the system is operating correctly there are pulses delivered at intervals by the circuit 58. These pulses keep the transistors 70 and 71 switched off. Should no such pulses appear capacitor 68 will discharge through resistor 69 and transistor 71 will turn on hard, effectively grounding the cathodes of the diodes 73$a$ and 73$d$. Diodes 73$a$ and 73$b$ sustain current in the relay windings 62$a$ and 62$b$ and diodes 73$c$ and 73$d$ turn off the transistors 60$c$ and 60$d$ irrespective of the signals from the register 52. The capacitor 68 and resistor 69 may be regarded as forming a timer circuit which is reset periodically by pulses from circuit 58 and having a time period well in excess of two cycles of the transmitter device.

In addition a further diode 74 has its anode connected to the cathode of the diodes 73$a$ to 73$d$ and its cathode connected to the supply rail 12. This diode 74 provide a path for recirculating current when any of the transistors 60$a$ to 60$d$ is switched off.

Reverting now to the failure warning circuit included in FIG. 2, this circuit includes an AND gate 100 with inputs from the clock 22 and from the C output terminal of the counter 21. The output of this gate 100 is applied to two further AND gates 101, 102. Gate 101 has an input from the Z terminal of the selector 20 and another input via an inverter 103 from the data rail 10. Gate 102 has a direct input from the data rail 10 and an input from the terminal Z via an inverter 104.

The failure warning circuit is operative during the first transmittal of utilization code, at which time the signals on the data rail 10 are those derived from the load control devices. If at any time whilst gates 101 and 102 are enabled by gate 100 (i.e. during the four clock pulses whilst C is high) the Z output is high but the data rail signal is low gate 101 will produce an output, indicating a filament or actuator failure. Similarly if the Z output is low whilst the data rail signal is high gate 102 will produce an output, indicating a system failure.

The system described above provides a multiplex control system for a plurality of separate loads which overcomes many of the prior art shortcomings. The system has very high immunity to interference and also incorporates simple fault monitoring and failsafe functions.

The system described is capable of being used for monitoring various functions as well as providing control. Thus, for example, an oil pressure warning switch may be connected appropriately to one of the groups of "load control" devices so that when that group is addressed one of the bits of the four-bit code transmitted back to the central unit will indicate whether this switch is open or closed.

In addition the data line can also be used for the transmission of analog signals such as fuel gauge signals. In order to permit such transmission one of the stages of the shift register 50 may be capable of receiving and storing analog signals instead of just digital signals. When the address code has been recognised the analog signal is received by this stage of the register 50 and then transmitted back to the central unit along with the other three digital signals. Preferably the stage which is suitable for analog signals is that from which the output to the data rail is taken.

With small modifications an extra bit of address code can be handled by the circuit described. The modifications required in FIG. 4 included the addition of an extra switch 57 and a connection between the data output of the control logic 53 to the address recognition logic. The first four internal clock pulses clock the first four bits of the address code into the register 50, but clocking of the latter is inhibited during the fifth pulse so that the signal on the data rail at this stage is not clocked into the register. The address recognition comparison is carried out during this fifth clock pulse.

Although the p.c.m. generator 13 is described above in terms of conventional CMOS hardward, the function can also be carried out conveniently utilising a suitably programmed micro-processor unit. The same unit can be used to process the data received from the individual groups A, B, C, D, etc and provide a suitable display.

The following features of the apparatus described assist in optimising noise immunity and ensuring that only valid outputs are obtained;
(a) The control logic of each group A,B,C,D, etc is only open for one third of the transmission period, except for the group which is addressed,
(b) the local clocks of the non-addressed units are inhibited except during address transmission,
(c) the utilization codes must be verified by being identical in two successive cycles before it is acted upon.
(d) any incorrect output stage will be corrected after only 2 successive cycles.
(e) synchronisation with the master oscillator cannot be lost, (f) CMOS integrated circuits, which have inherently high noise immunity, can be used for the receiver units, (g) each receiver unit can have a low input impedance (about 10 Kohms). Noise sources must therefore have a very low output impedance if they are to provide sufficient current to upset receiver operation.

I claim:

1. An automotive vehicle electrical system comprising a plurality of switch devices, a multiplicity of load devices each controlled by a corresponding load control device arranged in a number of groups, a transmitter device controlled by said switches and a plurality of receiver devices associated respectively with said groups of load control devices, the transmitter device cyclically generating on a data rail connected to all said receivers a pulse train consisting of a series of digital words, each such word including a first set of bits defining an address code appropriate to one of the receivers and a second set of bits defining a utilization code indicating the required state of the load control devices in the group associated with that receiver in accordance with the condition of associated ones of the switch devices, and wherein each receiver includes an input register for receiving signals from said data rail, address code recognition means operative when the address code part of each word has been received by the input register and means controlled by said address code recognition means for preventing the input register from receiving command data from the data rail except when said address code recognition means has recognised the address code forming the first part of the data word.

2. A automotive vehicle electrical system as claimed in claim 1 in which there is a second rail extending from the transmitter device to all the receiver devices and carrying synchronising signals generated by the transmitter devices.

* * * * *